(12) United States Patent
Tsuchida et al.

(10) Patent No.: US 10,714,993 B2
(45) Date of Patent: Jul. 14, 2020

(54) ROTOR, INTERIOR PERMANENT MAGNET MOTOR, AND COMPRESSOR

(71) Applicant: Mitsubishi Electric Corporation, Tokyo (JP)

(72) Inventors: Kazuchika Tsuchida, Tokyo (JP); Masahiro Nigo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 199 days.

(21) Appl. No.: 15/757,717

(22) PCT Filed: Oct. 27, 2015

(86) PCT No.: PCT/JP2015/080228
§ 371 (c)(1),
(2) Date: Mar. 6, 2018

(87) PCT Pub. No.: WO2017/072851
PCT Pub. Date: May 4, 2017

(65) Prior Publication Data
US 2019/0044400 A1    Feb. 7, 2019

(51) Int. Cl.
*H02K 1/27* (2006.01)
*F04D 25/06* (2006.01)
(Continued)

(52) U.S. Cl.
CPC ....... *H02K 1/2766* (2013.01); *F04D 25/0606* (2013.01); *F04D 29/403* (2013.01);
(Continued)

(58) Field of Classification Search
CPC ......... H02K 1/27; F04D 29/40; F25B 31/026; F25B 2600/021; F25B 31/023; F25B 2400/121
See application file for complete search history.

(56) References Cited

U.S. PATENT DOCUMENTS 5,672,926 A * 9/1997 Brandes ............... H02K 1/2746
310/181
5,731,647 A * 3/1998 Schuller ............... H02K 1/2746
310/114
(Continued)

FOREIGN PATENT DOCUMENTS

CN  204118885 U   1/2015
CN  204615531 U   9/2015
(Continued)

OTHER PUBLICATIONS

Office action dated Aug. 28, 2018 issued in corresponding JP patent application No. 2017-547227 (and English machine translation attached).
(Continued)

*Primary Examiner* — Naishadh N Desai
(74) *Attorney, Agent, or Firm* — Posz Law Group, PLC

(57) ABSTRACT

A rotor includes a cylindrical a rotor core having a plurality of magnet insertion holes extending along a central axis of the cylindrical shape and permanent magnets inserted into the magnet insertion holes, respectively. A slit extending along the central axis is provided between an outer circumferential surface of the rotor core and at least one of the magnet insertion holes. The slit inner lines extend toward the outer circumferential surface of the rotor core from the apex of the slit, the apex being located on a side of the magnet insertion holes. The slit outer line connects side ends of the slit inner lines located on a side opposite to the apex.

20 Claims, 9 Drawing Sheets

(51) Int. Cl.
*F04D 29/40* (2006.01)
*F25B 31/02* (2006.01)

(52) U.S. Cl.
CPC ............ *H02K 1/276* (2013.01); *F25B 31/023* (2013.01); *F25B 31/026* (2013.01); *F25B 2400/121* (2013.01); *F25B 2600/021* (2013.01)

(56) References Cited

U.S. PATENT DOCUMENTS

| | | | |
|---|---|---|---|
| 7,683,518 B2 * | 3/2010 | Yoshikawa | H02K 1/276 310/156.53 |
| 9,634,531 B2 | 4/2017 | Baba et al. | |
| 9,893,580 B2 * | 2/2018 | Soma | H02K 1/276 |
| 10,090,743 B2 | 10/2018 | Nigo et al. | |
| 10,135,307 B2 | 11/2018 | Tsuchida et al. | |
| 2001/0017499 A1 | 8/2001 | Kaneko et al. | |
| 2004/0007930 A1 * | 1/2004 | Asai | H02K 21/14 310/156.53 |
| 2005/0023922 A1 * | 2/2005 | Araki | H02K 1/2766 310/168 |
| 2005/0104468 A1 * | 5/2005 | Araki | H02K 1/2766 310/156.53 |
| 2007/0063607 A1 * | 3/2007 | Hattori | H02K 1/2766 310/156.53 |
| 2009/0045688 A1 * | 2/2009 | Liang | H02K 1/2766 310/156.07 |
| 2010/0117477 A1 * | 5/2010 | Yoshino | H02K 1/276 310/156.53 |
| 2012/0060547 A1 * | 3/2012 | Fujisue | F04B 35/04 62/498 |
| 2015/0280500 A1 * | 10/2015 | Nigo | H02K 21/16 310/156.53 |
| 2016/0172913 A1 | 6/2016 | Baba et al. | |
| 2017/0098970 A1 | 4/2017 | Tsuchida et al. | |
| 2017/0110944 A1 | 4/2017 | Nigo et al. | |

FOREIGN PATENT DOCUMENTS

| | | |
|---|---|---|
| CN | 106233580 A | 12/2016 |
| JP | 07-336917 A | 12/1995 |
| JP | 2001-037186 A | 2/2001 |
| JP | 2001-314052 A | 11/2001 |
| JP | 2005-245148 A | 9/2005 |
| WO | 2015/166532 A1 | 11/2015 |

OTHER PUBLICATIONS

International Search Report dated Jan. 19, 2016 in corresponding International patent application No. PCT/JP2015/080228.
Office Action dated May 24, 2019 issued in corresponding CN patent application No. 201580083314.5 (and English translation).

* cited by examiner

ROTOR, INTERIOR PERMANENT MAGNET MOTOR, AND COMPRESSOR

CROSS REFERENCE TO RELATED APPLICATION

This application is a U.S. national stage application of International Patent Application No. PCT/JP2015/080228 filed on Oct. 27, 2015, the disclosure of which is incorporated herein by reference.

TECHNICAL FIELD

The present invention relates to a rotor having permanent magnets embedded in a rotor core thereof, an interior permanent magnet motor, and a compressor.

BACKGROUND

Patent Literature 1 discloses a conventional interior permanent magnet motor having a plurality of slits provided on a radially outer side of a magnet insertion hole in a rotor. For such an interior permanent magnet motor, the slit acts to reduce harmonic components of a magnetic flux density waveform, and a harmonics of an induced voltage and a cogging torque, which can reduce noises and vibrations.

PATENT LITERATURE

Patent Literature 1: Japanese Patent Application Laid-Open No. 2005-245148

For the configuration disclosed in Patent Literature 1, unfortunately, some slit is connected to the magnet insertion hole, and the width of the connected portion of the slit gradually increases toward the outer circumferential portion of the rotor. Since the connected portion defines an air region on the side of the magnet surface, thus, a utilization efficiency of the magnetic flux emitted from the magnet may be deteriorated accordingly.

SUMMARY

The present invention has been made in view of the above, and an object of the present invention is to provide a rotor capable of reducing the noises and vibrations while reducing a loss of the magnetic flux emitted from the magnet.

To solve the problem and achieve the object, the rotor according to the present invention includes a cylindrical rotor core having a plurality of magnet insertion holes extending along a central axis of the cylindrical shape, and permanent magnets inserted into the magnet insertion holes, respectively. A slit extending along the central axis is provided between an outer circumferential surface of the rotor core and at least one of the magnet insertion holes. In a plan view where the central axis is vertical, the slit has a triangular shape projecting toward the magnet insertion holes. In a plan view where the central axis is vertical, the slit includes a pair of slit inner lines and a slit outer line. The slit inner lines extend toward the outer circumferential surface of the rotor core from an apex of the slit, the apex being located on the side where the magnet insertion holes are located. The slit outer line connects side ends of the slit inner lines, the side ends being located on a side opposite to the apex.

The rotor according to the present invention has an effect of reducing the noises and vibrations while reducing the loss of the magnetic flux emitted from the magnet.

DETAILED DESCRIPTION

Hereinafter, a rotor, an interior permanent magnet motor, and a compressor according to embodiments of the present invention are described in detail with reference to the drawings. The present invention is not limited to the embodiments.

First Embodiment

Figure 1:
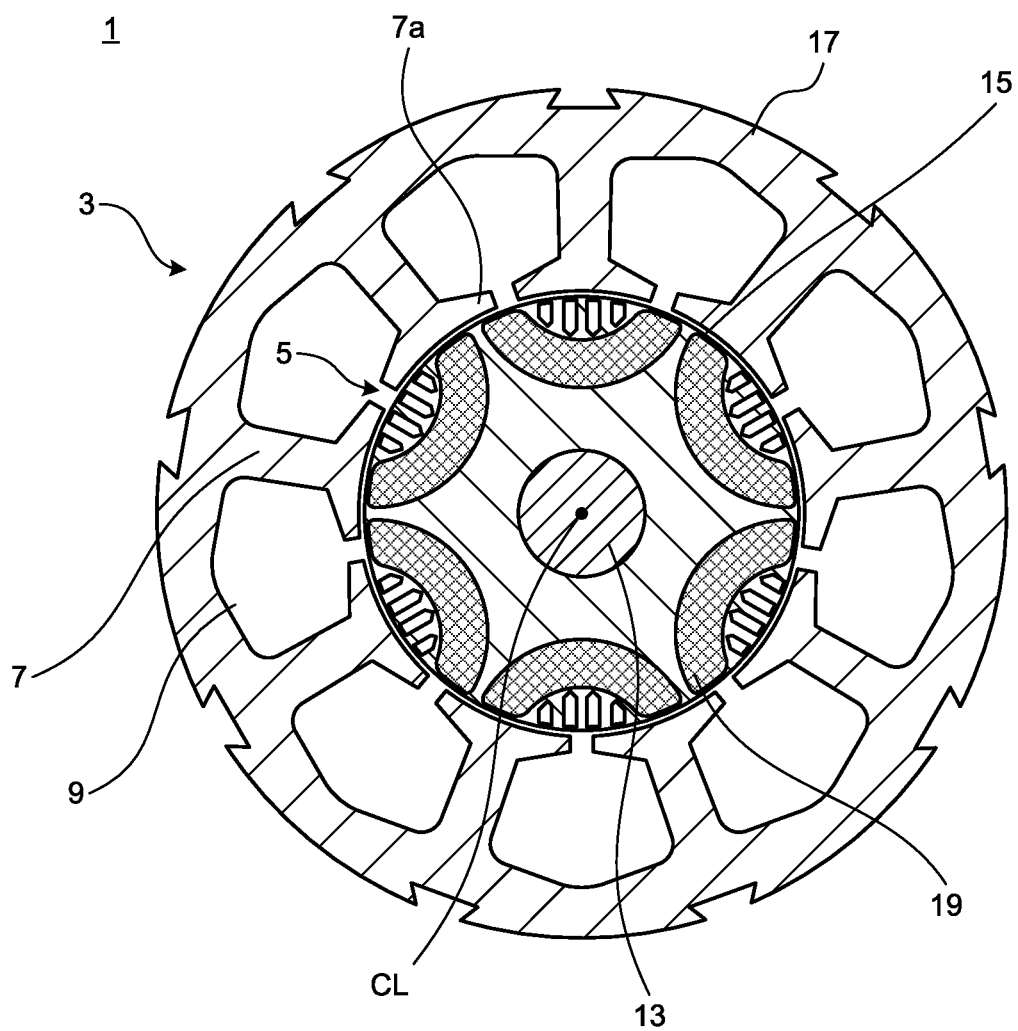
FIG. 1 is a view illustrating a cross-section orthogonal to a rotation center line of an interior permanent magnet motor according to a first embodiment of the present invention.
Figure 2:
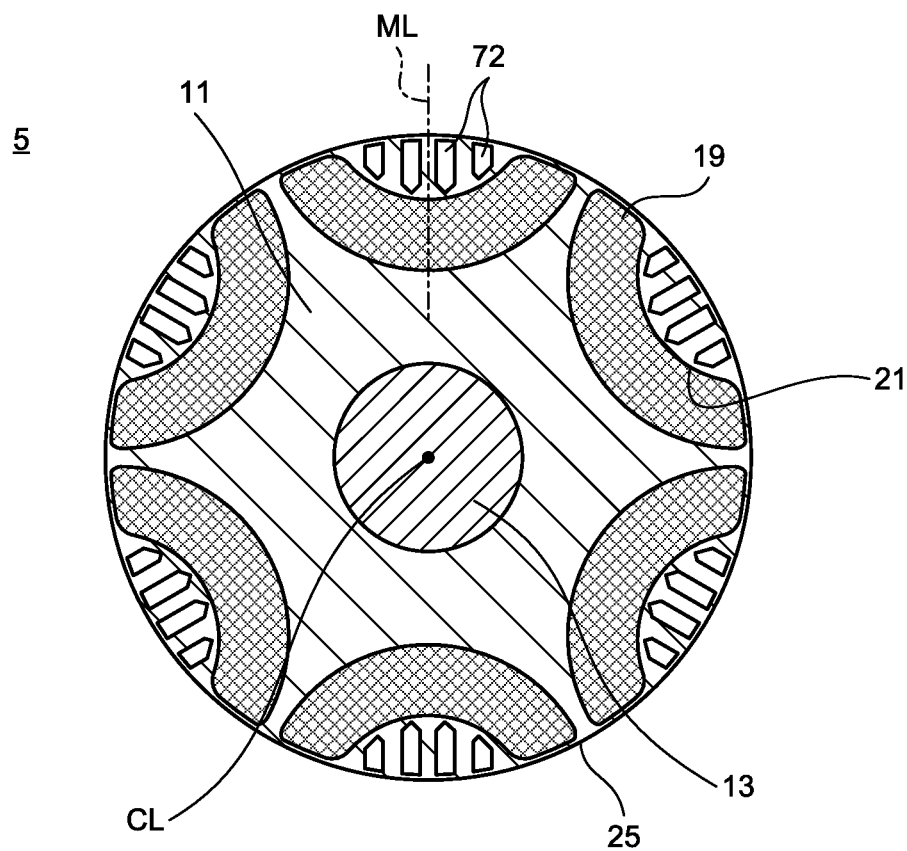
FIG. 2 is a view illustrating a rotor in the interior permanent magnet motor in FIG. 1.
Figure 3:
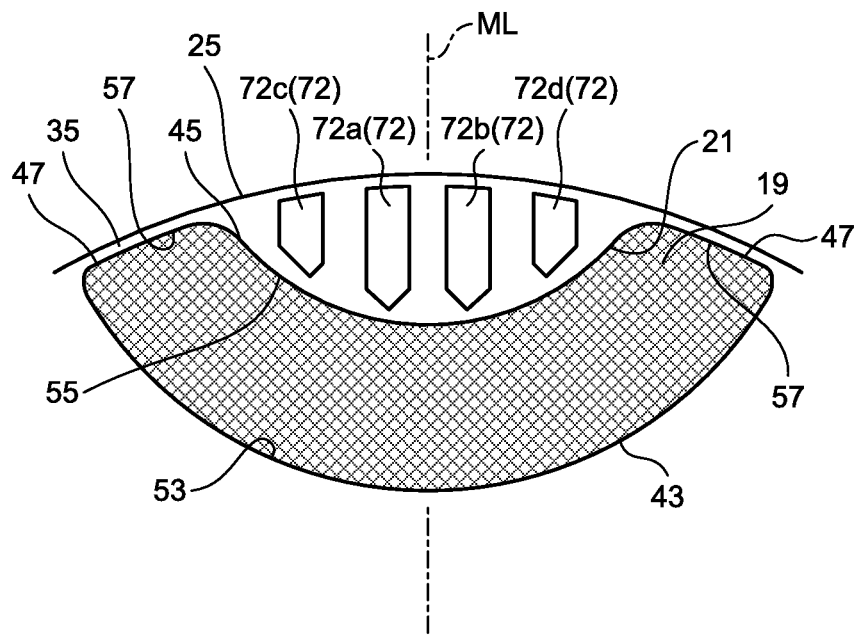
FIG. 3 is an enlarged view of a peripheral part of one permanent magnet in the rotor in FIG. 2.
Figure 4:
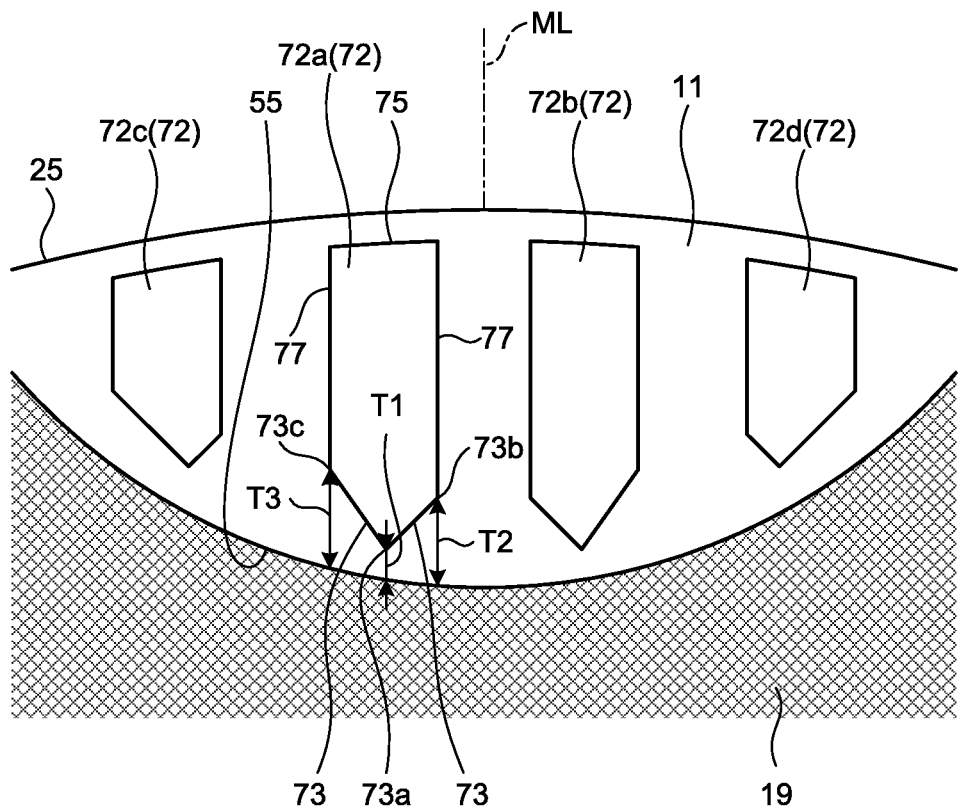
FIG. 4 is an enlarged view of a plurality of slits in FIG. 3.

FIG. 1 is a view illustrating a cross-section orthogonal to a rotation center line of an interior permanent magnet motor according to a first embodiment of the present invention. FIG. 2 is a view illustrating a rotor in the interior permanent magnet motor in FIG. 1. FIG. 3 is an enlarged view of a peripheral part of one permanent magnet in the rotor in FIG. 2. FIG. 4 is an enlarged view of a plurality of slits in FIG. 3.

An interior permanent magnet motor 1 includes a cylindrical stator 3 and a rotor 5 rotatably disposed inside the stator 3. The stator 3 has a plurality of tooth portions 7. Each of the plurality of tooth portions 7 is adjacent to other tooth portions 7 via corresponding slot portions 9. The plurality of tooth portions 7 and the plurality of slot portions 9 are alternately disposed at equal intervals along a circumferential direction. A known stator winding which is not illustrated is wound around each of the plurality of tooth portions 7 in a known manner.

The rotor 5 includes a cylindrical rotor core 11 and a bar-shaped shaft 13 fitting in the rotor core 11. The shaft 13 is coupled to an axial center portion of the rotor core 11 by shrink fitting, press fitting, and the like, and transmits rotational energy to the rotor core 11. An air gap 15 is defined between a core outer circumferential surface 25 of the rotor 5 and an inner circumferential surface of the stator 3.

The rotor 5, which has such a structure, is held inside the stator 3 with the air gap 15 interposed between the rotor 5 and the stator such that the rotor 5 is rotatable about a rotation center line CL coinciding with the central axis of the rotor core 11. More specifically, a current having a frequency synchronized with an instructed rotational speed is supplied to the stator 3 to generate a rotation magnetic field and rotate the rotor 5.

Next, the structures of the stator 3 and the rotor 5 are described in detail. The stator 3 includes a stator core 17. The stator core 17 is formed by punching an electromagnetic steel sheet into a predetermined shape and stacking a predetermined number of electromagnetic steel sheets and fastening the electromagnetic steel sheets together by caulking.

The nine slot portions 9 are radially formed on an inner diameter side of the stator core 17 and disposed at substantially equal intervals in the circumferential direction. The stator core 17 has a region between the adjacent slot portions 9 and this region is referred to as the tooth portion 7. Each tooth portion 7 extends in a radial direction and projects toward the rotation center line CL. The tooth portion 7 has its most part having a circumferential width that is substantially equal from the radially outer side to the radially inner side while the tooth portion 7 has a tooth tip portion 7a at a distal end portion located on the radially innermost side of the tooth portion 7. Each of the tooth tip portions 7a is formed in an umbrella-like shape widening at its opposite sides in the circumferential direction.

A stator winding (not illustrated) that configures a coil (not illustrated) for generating a rotation magnetic field is wound around the tooth portion 7. The coil is formed by directly winding a magnet wire around a magnetic pole tooth via an insulator. This winding method is referred to as concentrated winding. The coils are connected in three-phase Y connection. The number of turns and a wire diameter of the coil are determined depending upon the required characteristics (rotational speed, torque, and the like), a voltage specification, and a cross sectional area of a slot. In this embodiment, the split teeth are arranged in a strip for facilitating the winding operation, and a magnet wire having an appropriate wire diameter is wound around each magnetic pole tooth by predetermined turns. After the winding of the wire, the split teeth are rolled into an annular shape, and then, welded together to thereby form a stator.

As is the case of the stator core 17, for example, the rotor core 11 is configured by punching an electromagnetic steel sheet having the substantially same thickness as the electromagnetic steel sheet of the stator core 17 into a predetermined shape and stacking a predetermined number of electromagnetic steel sheets and fastening the electromagnetic steel sheets together by caulking.

Provided inside the rotor core 11 is a plurality (six in this specific example) of permanent magnets 19 magnetized so that N poles and S poles of the permanent magnets 19 are alternately arranged. As illustrated in FIGS. 1 and 2, each permanent magnet 19 is curved in an arc shape and is disposed so that the arc-shaped permanent magnet 19 is convex toward the center side of the rotor 5.

More specifically, (six) magnet insertion holes 21 corresponding in number to the (six) permanent magnets 19 are formed in the rotor core 11, and each of the permanent magnets 19 is inserted in the corresponding one of the plurality of magnet insertion holes 21. That is, both the plurality of permanent magnets 19 and the plurality of magnet insertion holes 21 are formed in arc shapes that are convex toward the center of the rotor 5. As illustrated in FIGS. 1 and 2, the single permanent magnet 19 is inserted into the single magnet insertion hole 21. The rotor 5 may have any number of the magnetic poles that is equal to or more than two. The present embodiment gives the six poles by way of example.

In the present invention, at least one slit needs to be formed between the core outer circumferential surface of the rotor 5 and a hole outer line of each magnet insertion hole 21, as is described later. In the first embodiment, by way of example, the plurality of (more specifically, four) slits is formed for each of six magnetic poles.

Next, the details of the permanent magnet and the magnet insertion hole are described mainly with reference to FIG. 3. Each of the permanent magnets 19 includes an inner-side external surface 43, an outer-side external surface 45, and a pair of side external surfaces 47, in a plan view where the rotation center line CL is vertical. Note that the terms "outer" and "inner" that are prefixes of the inner-side external surface 43 and the outer-side external surface 45 indicate a radially inner side and a radially outer side as a result of the relative comparison, in a plan view where the rotation center line CL is vertical.

Each magnet insertion hole 21 includes a hole inner line 53, a hole outer line 55, and a pair of hole side lines 57, all of which define an outline of the hole, in a plan view where the rotation center line CL is vertical. In addition, the terms "outer side" and "inner side" that are prefixes of the hole inner line and the hole outer line respectively indicate a radially inner side and a radially outer side as a result of the relative comparison, in a plan view where the rotation center line CL is vertical.

The hole outer line 55 is defined by a first arc having a first arc radius. The hole inner line 53 is defined by a second arc having a second arc radius larger than the first arc radius. The first arc radius and the second arc radius have a common radius center, and the common radius center is located on the radially outer side of the permanent magnet 19 and the magnet insertion hole 21 and located on a corresponding magnetic pole center line ML. In other words, the hole inner line 53 and the hole outer line 55 are concentrically formed, and the centers of the first arc and the second arc coincide with the orientation center (orientation focus) of the permanent magnet. The magnetic pole center line is a line extending from the rotation center line CL and passing through the center of the pole.

As illustrated in FIG. 3, each of the pair of side external surfaces 47 connects the corresponding ends of the inner-side external surface 43 and the outer-side external surface 45, and each of the pair of hole side lines 57 connects the corresponding ends of the hole inner line 53 and the hole outer line 55.

The rotor core 11 includes an inter-pole thin portion 35 having a uniform thickness between the core outer circumferential surface 25 and each hole side line 57 of the magnet insertion hole 21. Each of the inter-pole thin portions 35, which serves as a path of leakage magnetic flux between the adjacent magnetic poles, is preferably as thin as possible. In this embodiment, the thickness of the inter-pole thin portion 35 is set to about a thickness of an electromagnetic steel sheet, which is the minimum width allowing for the pressing.

Next, the details of the slits are described with reference to FIGS. 3 and 4. Each of four slits 72 (72a, 72b, 72c, and 72d) extends in a direction parallel to the corresponding magnetic pole center line ML and is a hole passing through the rotor core 11 in the direction of the rotation center line CL.

Each of the slits 72a, 72b, 72c, and 72d has a slit inner lines 73, a slit outer line 75, and a pair of slit side lines 77, all of which define an outline of the slit, in a plan view where the rotation center line CL is vertical. Note that the terms "outer" and "inner" that are prefixes of the slit inner line 73 and the slit outer line 75 indicate a radially inner side and a radially outer side as a result of the relative comparison, in a plan view where the rotation center line CL is vertical.

Each of the slits 72a, 72b, 72c, and 72d has a triangle-shaped end on the side of the magnet insertion hole 21. That is, the slit inner lines 73 of each of the slits 72a, 72b, 72c, and 72d include an apex 73a of the triangle that is convex toward the magnet insertion hole 21, two sides of the triangle meeting together at the apex 73a, and a pair of side ends 73b and 73c opposite to the apex at which the two sides meet together. Although FIG. 4 illustrates, by way of example, the triangle having the different lengths of the slit inner lines 73, the slit inner lines 73 may have their lengths equal to each other to form an isosceles triangle. In this case, the slit inner lines 73 are symmetrically disposed with respect to an imaginary line extending in parallel to the corresponding magnetic pole center line ML and passing through the apex 73a.

The slit outer line 75 extends substantially along the core outer circumferential surface 25. The pair of slit side lines 77 extends along the corresponding magnetic pole center line ML. The slit inner lines 73 have their ends connected to the slit side lines 77, which ends are the pair of side ends 73b and 73c.

That is, the end of each of the slits 72a, 72b, 72c, and 72d on the side of the magnet insertion hole 21 includes the apex 73a and the pair of side ends 73b and 73c. In a plan view where the rotation center line CL is vertical, the side ends 73b and 73c of each of the slits 72a, 72b, 72c, and 72d are spaced from the hole outer line 55 of the magnet insertion hole 21 by intervals T2 and T3 (the intervals extending in the direction of the corresponding magnetic pole center line ML), respectively. The intervals T2, T3 are larger than an interval T1 (the interval extending in the direction of the corresponding magnetic pole center line ML) between the apex 73a and the hole outer line 55 of the magnet insertion hole 21 (T1<T2 and T1<T3). In addition, the interval T1 between the apex 73a of each of the slits 72a, 72b, 72c, and 72d and the hole outer line 55 of the magnet insertion hole 21 is larger than the thickness of the electromagnetic steel sheet configuring the rotor core 11.

Next, the function of the slits according to the first embodiment is described with reference to FIGS. 5 to 9.

Figure 5:
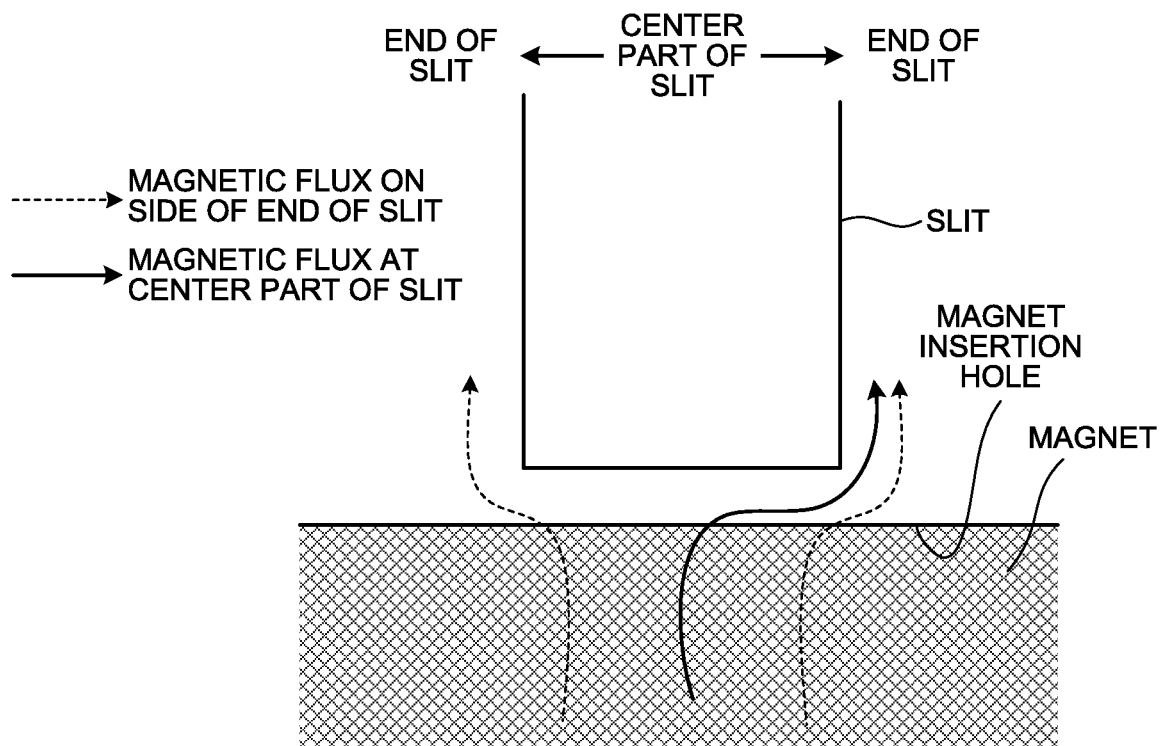
FIG. 5 is a view schematically illustrating a flow of a magnetic flux in a case where an interval between an end of the slit on a side of a magnet insertion hole and the magnet insertion hole is constant.

First, for brief description on the action according to the present embodiment, a mode in which the interval between the magnet insertion hole and the slit inner line is constant is illustrated in FIG. 5. When the slit is disposed for the purpose of reducing a noise, the magnetic flux on the side of the slit end passes through the rotor core, avoiding the slit. The magnetic flux at the center of the slit also passes through the rotor core, avoiding the slit. As a result, the magnetic saturation occurs and a loss of the magnetic flux occurs if the thickness between the magnet insertion hole and the slit is thin.

Figure 6:
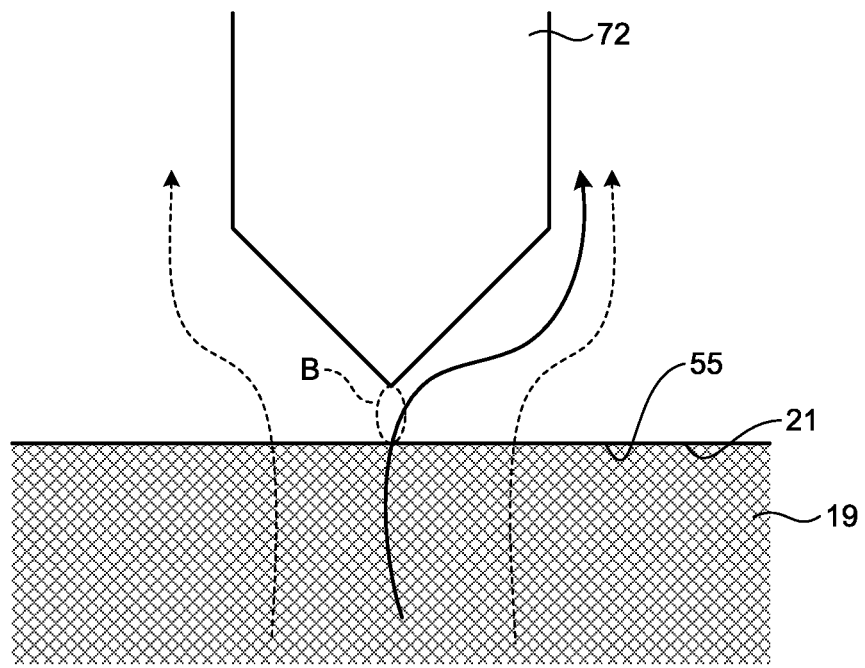
FIG. 6 is a view schematically illustrating a flow of the magnetic flux in a case where a shape of the end of the slit on the side of the magnet insertion hole is a triangle.

In contrast, the slit 72 has the triangular end on the side of the magnet insertion hole 21, as illustrated in FIG. 6, such that the interval between the end of the slit 72 on the side of the magnet insertion hole 21 and the magnet insertion hole 21 increases from the center part in the slit width direction (which is orthogonal to the corresponding magnetic pole center line ML) toward the ends in the slit width direction, thus allowing the magnetic flux, generated from the permanent magnet 19 facing the center part in the slit width direction, to be efficiently taken into the rotor core with low loss.

Figure 7:
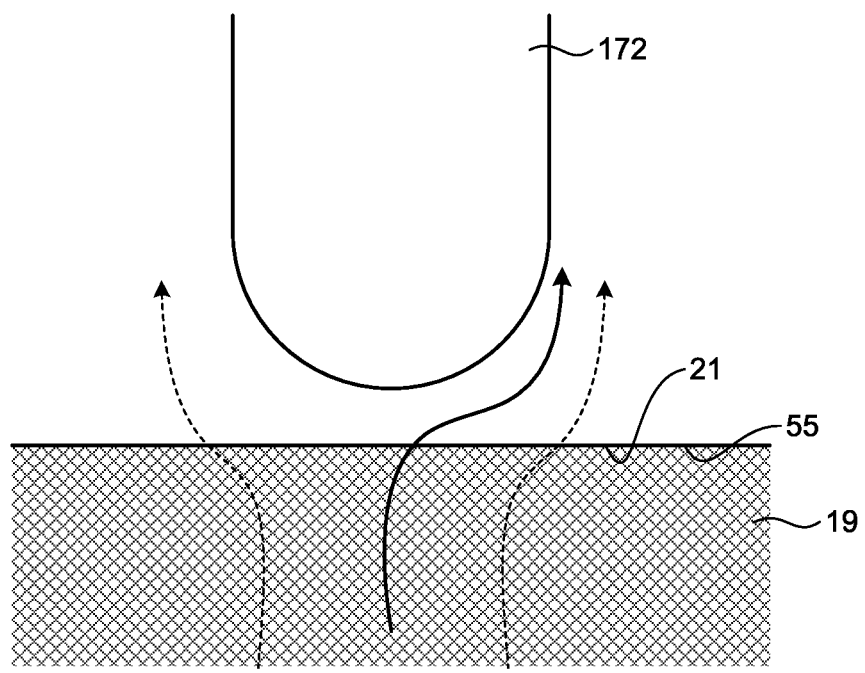
FIG. 7 is a view schematically illustrating a flow of the magnetic flux in a case where the shape of the end of the slit on the side of the magnet insertion hole is an arc.
Figure 8:
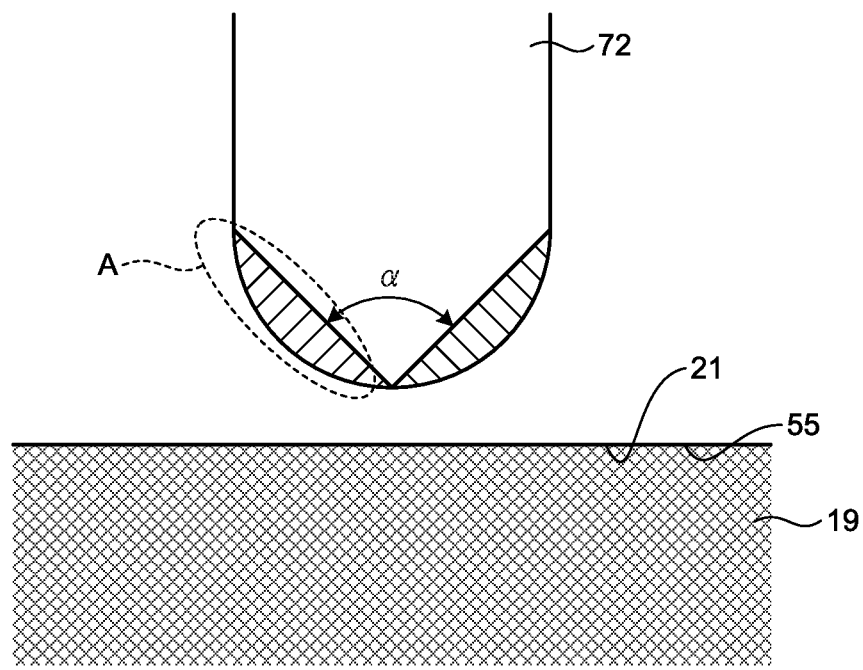
FIG. 8 is a diagram comparing the shape of the end of the slit in FIG. 6 with the shape of the end of the slit in FIG. 7.
Figure 9:
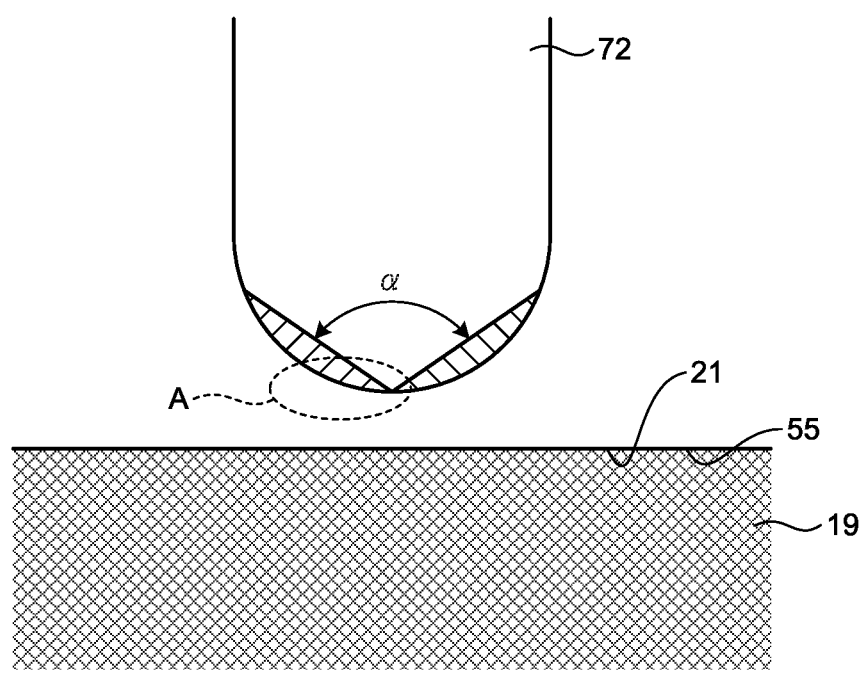
FIG. 9 is a diagram comparing the shape of the end of the slit in FIG. 6 with the shape of the end of the slit in FIG. 7.

Although providing an end of a slit 172 with an arc shape as illustrated in FIG. 7 allows the interval between the end of the slit 172 and the magnet insertion hole 21 to increase from the center part in the slit width direction toward the ends in the slit width direction, there is a difference between the triangle in FIG. 6 and the arc in FIG. 7, which is discussed below. That is, as illustrated in FIG. 8, the range of the rotor core occupied by the slit 72 having the triangular end of FIG. 6 and the range of the rotor core occupied by the slit 172 having the arc-shaped end of FIG. 7 differ from each other in shaded areas denoted by the reference character A. The shaded area exists regardless of a magnitude of an opening angle $\alpha(0°<\alpha<180°)$ of the slit end. Although FIG. 9 illustrates, by way of example, a mode in which the opening angle $\alpha$ is larger than the opening angle $\alpha$ in FIG. 8, a small shaded area still exists in this case of FIG. 8. Since the magnetic flux of the permanent magnet 19 at the center part in the slit width direction flows into the core via a thin portion B (see FIG. 6) located at the center in the slit width direction and then follows a path toward the end in the slit width direction, the thickness of the center part in the slit width direction (the interval between the end of the slit on the side of the magnet insertion hole 21 and the magnet insertion hole 21 in the direction of the corresponding magnetic pole center line) is important. It is thus useful for the end of the slit to have the triangular shape formed by the straight lines. In other words, the thickness may change from the center part in the slit width direction toward the opposite sides in the slit width direction, in any other mode than the symmetrical change mode.

Furthermore, since the minimum thickness of the stacked steel sheet when the stacked steel is pressed can be taken as the thickness of the stacked steel sheet, the interval between the apex 73a of the triangular shape and the magnet insertion hole 21 is set to be equal to or larger than the thickness of the stacked steel sheet. Providing the end of the slit 72 facing the permanent magnet 19 (magnet insertion hole 21) with the shape as described above can achieve an effect of reducing the magnetic flux loss regardless of the shape of the magnet.

The rotor 5 configured as discussed above and the interior permanent magnet motor 1 including the rotor 5 in the first embodiment can provide the following advantages. Since at least one slit 72 is provided between the core outer circumferential surface 25 and the hole outer line 55 of the magnet insertion hole 21, vibrations and noises generated by magnetic attraction force of the core outer circumferential surface 25 can be suppressed. Since the shape of the end of the slit 72 on the side of the magnet insertion hole 21 is the triangle, it is possible to reduce the loss of the magnetic flux generated from a portion of the permanent magnet 19 facing the slit 72, thereby increasing the magnetic force. That is, it is possible to reduce the noises and vibrations while reducing the loss of the magnetic flux emitted from the permanent magnet 19. In addition to the end of the slit 72 on the side of the magnet insertion hole 21 having the triangular shape, the end of the slit 72 on the side of the magnet insertion hole 21 does not communicate with the magnet insertion hole 21 through an air region (the rotor core 11 exists over the entire region extending in the width direction of the slit 72 between the end of slit 72 on the side of magnet insertion hole 21 and the magnet insertion hole 21). This helps to rigidify the rotor core 11, and avoids the occurrence of the loss of the magnetic flux due to the air region existing between the end of the slit 72 on the side of the magnet insertion hole 21 and the magnet insertion hole 21.

Figure 10:
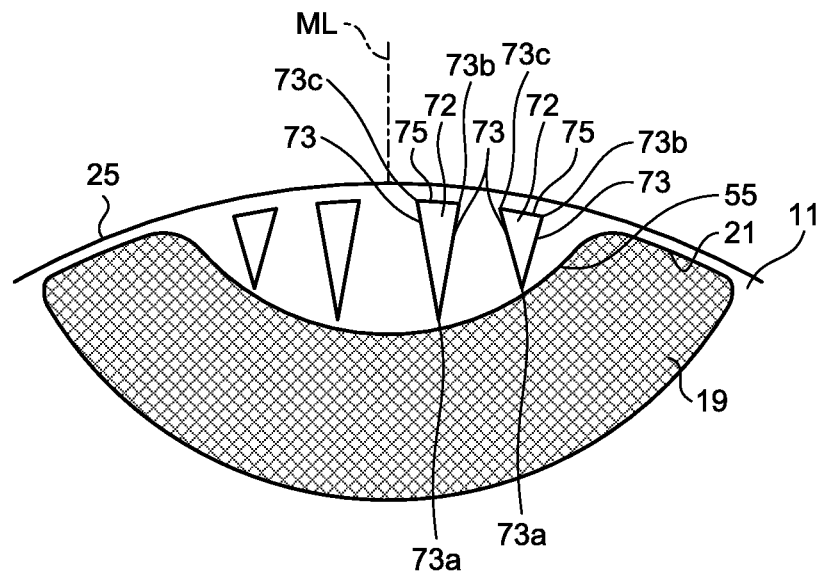
FIG. 10 is a view illustrating a first modification to the shape of the slit formed in a rotor core of the interior permanent magnet motor according to the first embodiment.

Next, modifications to the shape of the slit 72 formed in the rotor core 11 are described. FIG. 10 is a view illustrating the first modification to the shape of the slit 72 formed in the rotor core 11 of the interior permanent magnet motor 1 according to the first embodiment.

As illustrated in FIG. 10, the entirety of the slit 72 in the first modification has a triangular shape projecting toward the magnet insertion hole 21, in a plan view where the rotation center line CL is vertical. More specifically, in a plan view where the rotation center line CL is vertical, the slit 72 includes the pair of slit inner lines 73 extending from the apex 73a on the side of the magnet insertion hole 21 toward the outer circumferential surface of the rotor core 11, and the slit outer line 75 connecting the side ends 73b and 73c of the slit inner lines 73, the side ends 73b and 73c being located opposite the apex 73a.

Since the shape of the slit 72 in the first modification can increase a width of the magnetic path on the side of the magnet insertion hole 21 for the similar reasons discussed with reference to FIG. 6 to FIG. 9, the loss of the magnetic flux emitted from the portion of the magnet facing the slit 72 can be reduced and the magnetic force can be increased.

Figure 11:
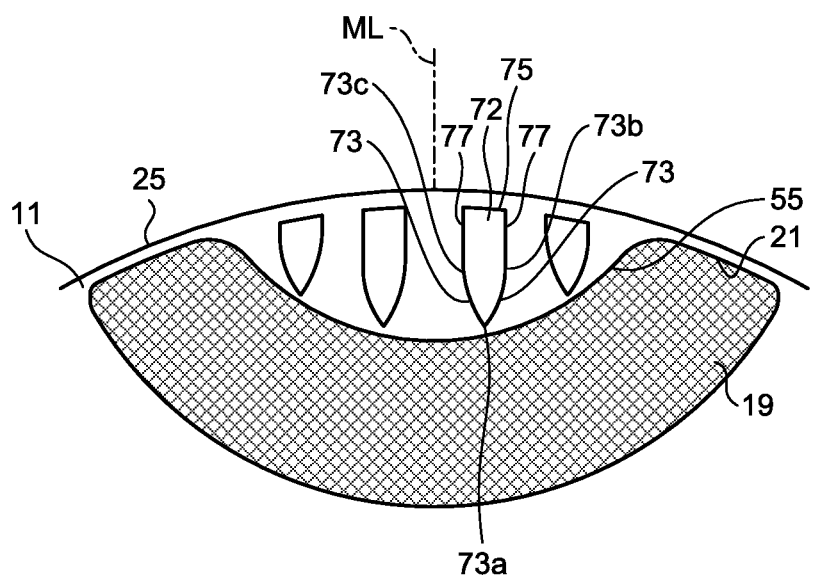
FIG. 11 is a view illustrating a second modification to the shape of the slit formed in the rotor core of the interior permanent magnet motor according to the first embodiment.

FIG. 11 is a view illustrating a second modification to the shape of the slit 72 formed in the rotor core 11 of the interior permanent magnet motor 1 according to the first embodiment.

As illustrated in FIG. 11, the pair of slit inner lines 73 defining a part of the slit 72 in the second modification is curved lines extending from the apex 73a toward the outer circumferential surface of the rotor core 11, in a plan view where the rotation center line CL is vertical. The slit inner line 73 is the curve that is convex toward the outside of the slit 72.

Since the shape of the slit 72 in the second modification can increase a width of the magnetic path on the side of the magnet insertion hole 21 for the similar reasons discussed with reference to FIG. 6 to FIG. 9, the loss of the magnetic flux emitted from the portion of the magnet facing the slit 72 can be reduced and the magnetic force can be increased.

Figure 12:
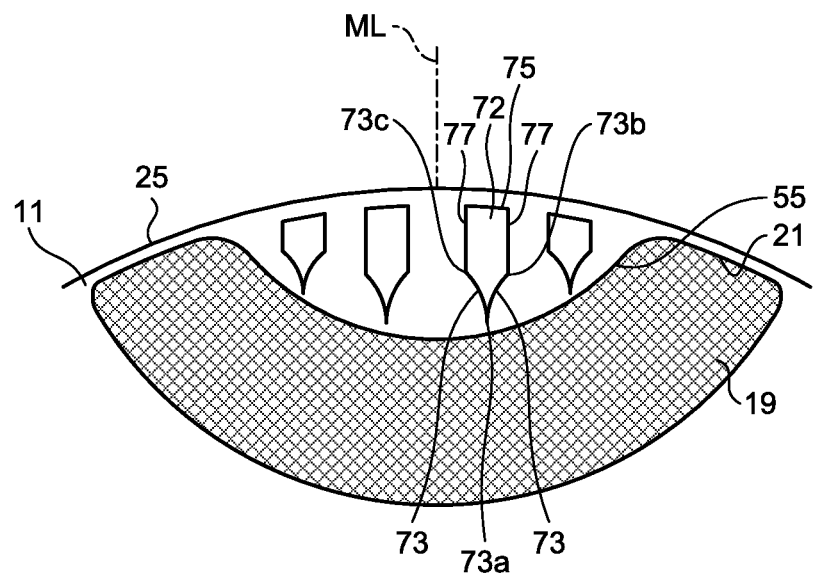
FIG. 12 is a view illustrating a third modification to the shape of the slit formed in the rotor core of the interior permanent magnet motor according to the first embodiment.

FIG. 12 is a view illustrating a third modification to the shape of the slit 72 formed in the rotor core 11 of the interior permanent magnet motor 1 according to the first embodiment.

As illustrated in FIG. 12, the pair of slit inner lines 73 defining a part of the slit 72 in the third modification is curved lines extending from the apex 73a toward the outer circumferential surface of the rotor core 11 in a plan view where the rotation center line CL is vertical, as in the second modification, the curved slit inner line 73 is convex toward the inside of the slit 72.

Since the shape of the slit 72 in the third modification can increase a width of the magnetic path on the side of the magnet insertion hole 21 for the similar reasons discussed with reference to FIG. 6 to FIG. 9, the loss of the magnetic flux emitted from the portion of the magnet facing the slit 72 can be reduced and the magnetic force can be increased.

Note that one of the pair of slit inner lines 73 defining the part of the slit 72 may be an outwardly convex curve and the other slit inner line 73 may be an inwardly convex curve.

Figure 13:
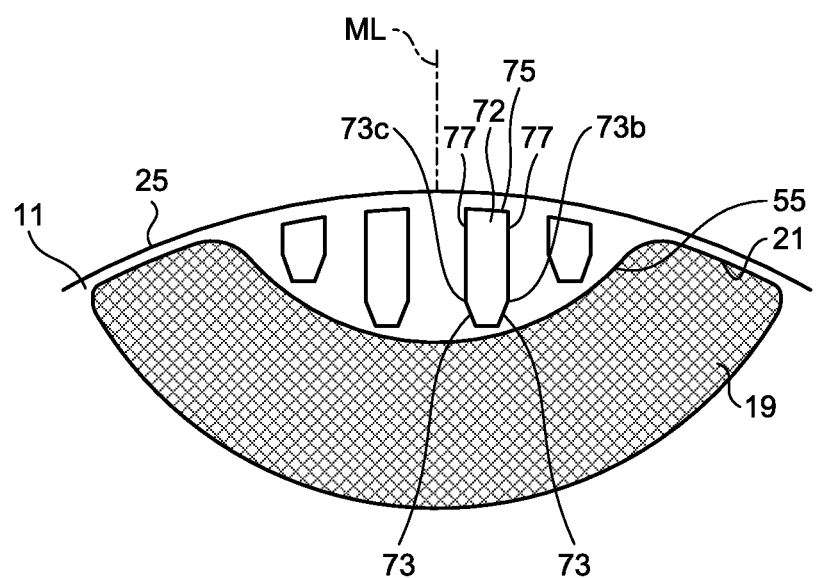
FIG. 13 is a view illustrating a fourth modification to the shape of the slit formed in the rotor core of the interior permanent magnet motor according to the first embodiment.

FIG. 13 is a view illustrating a fourth modification to the shape of the slit 72 formed in the rotor core 11 of the interior permanent magnet motor 1 according to the first embodiment.

As illustrated in FIG. 13, the slit 72 in the fourth modification has a trapezoidal portion whose width between a pair of slit inner lines decreases toward the magnet insertion hole 21 in a plan view where the rotation center line CL is vertical. In other words, the triangle portion of the slit 72 has its chamfered end on the side of the magnet insertion hole 21.

Chamfering the end in this manner can reduce the sharp edges which tend to cause chipping, from the shape of a blade used for forming the slit 72. Accordingly, the life of the blade used for forming the slit 72 can be prolonged. The chamfered end may be rounded.

Since the shape of the slit 72 in the fourth modification can increase a width of the magnetic path on the side of the magnet insertion hole 21 for the similar reasons discussed with reference to FIG. 6 to FIG. 9, the loss of the magnetic flux of the magnet emitted from the portion facing to the slit 72 can be reduced, and magnetic force can be increased.

Figure 14:
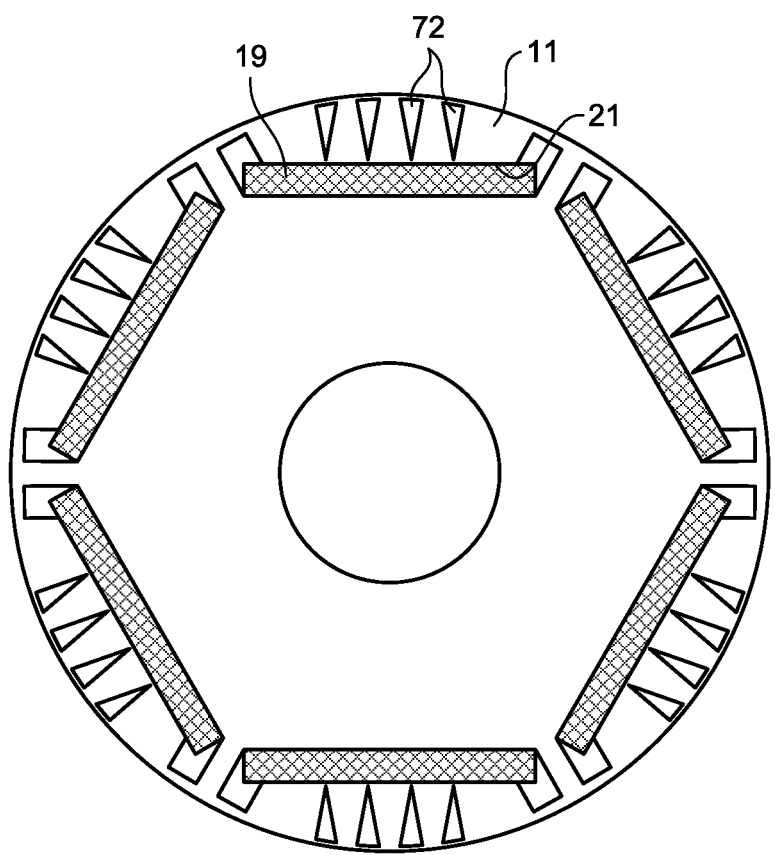
FIG. 14 is a view illustrating an exemplary rotor core in which flat plate-shaped permanent magnets are embedded.

Although the foregoing description gives an example in which the magnet insertion hole 21 and the permanent magnet 19 are formed in an arc shape that is convex toward the center of the rotor 5, as illustrated in FIG. 14, the magnet insertion hole 21 and the permanent magnet 19 may be configured by planes that are not convex, in a plan view where the rotation center line CL is vertical. That is, the flat-plate-shaped permanent magnet 19 may be used and the magnet insertion hole 21 allowing the insertion of the flat-plate-shaped permanent magnet 19 therein may be formed in the rotor core 11.

Although the present embodiment gives, by way of example, the slit 72 passing through the rotor core 11, the slit is not limited to this. For example, the electromagnetic steel sheets having no slits 72 therein are stacked on the end surface of the rotor core 11 such that the slit 72 may be formed as an space in the rotor core 11.

Second Embodiment

Next, a rotary compressor to which the interior permanent magnet motor according to the first embodiment is mounted is described as a second embodiment of the present invention. Although the present invention includes a compressor to which the interior permanent magnet motor according to the first embodiment is mounted, the type of the compressor is not limited to the rotary compressor.

Figure 15:
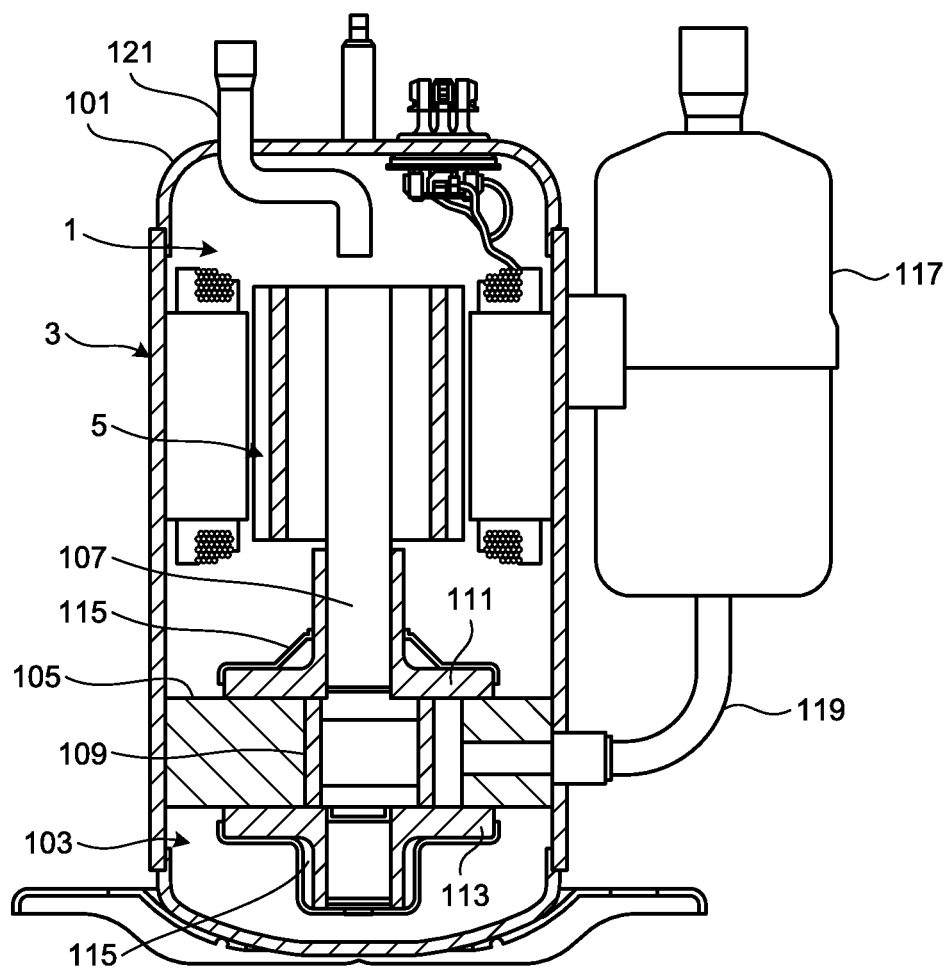
FIG. 15 is a longitudinal sectional view of a rotary compressor in which an interior permanent magnet motor is mounted.

FIG. 15 is a longitudinal sectional view of a rotary compressor to which an interior permanent magnet motor is mounted. A rotary compressor 100 includes the interior permanent magnet motor 1 (electric element) and a compression element 103 in a sealed container 101. Although not illustrated, refrigerating machine oil for lubricating each sliding portion of the compression element 103 is stored at the bottom of the sealed container 101.

The compression element 103 mainly includes a cylinder 105 disposed in a vertically stacked state, a rotary shaft 107 that is a shaft rotated by the interior permanent magnet motor 1, a piston 109 fitting in the rotary shaft 107, a vane (not illustrated) dividing the inside of the cylinder 105 into an intake side and a compression side, a pair of upper and lower frames 111 and 113 closing the axial end surfaces of the cylinder 105, and mufflers 115 attached to the upper frame 111 and the lower frame 113, respectively. The rotary shaft 107 rotatably fits in the upper frame 111 and the lower frame 113.

The stator 3 of the interior permanent magnet motor 1 is directly attached to the sealed container 101 by a method such as shrink fitting or welding, and held thereby. Electric power is supplied from a glass terminal secured to the sealed container 101 to the coils of the stator 3.

The rotor 5 is disposed on the radially inner side of the stator 3 with a gap interposed therebetween, and is rotatably held by the bearing portions (the upper and lower frames 111 and 113) of the compression element 103 via the rotary shaft 107 (the shaft 13) disposed at the center of the rotor 5.

Next, an operation of the rotary compressor 100 is described. A refrigerant gas supplied from an accumulator 117 is sucked into the cylinder 105 through a suction pipe 119 secured to the sealed container 101. Energizing the inverter rotates the interior permanent magnet motor 1, which in turn rotates the piston 109 fitting in the rotary shaft 107 within the cylinder 105. As a result, the refrigerant is compressed in the cylinder 105. After passing through the muffler 115, the refrigerant ascends in the sealed container 101. At this time, the refrigerating machine oil is mixed into the compressed refrigerant. When this mixture of the refrigerant and the refrigerating machine oil passes through an air hole provided in the rotor core 11, separation of the refrigerant from the refrigerating machine oil is facilitated, thereby preventing the refrigerating machine oil from flowing into a discharge pipe 121. The compressed refrigerant is then supplied to a high-pressure side of a refrigeration cycle through the discharge pipe 121 provided in the sealed container 101.

Note that, although the refrigerant of the rotary compressor 100 may be R410A, R407C, R22, and the like which have been traditionally used, any refrigerant such as a refrigerant having a low global-warming potential (GWP) may be applied. From the viewpoint of prevention of the global warming, the low GWP refrigerant is desirable. Examples of the low GWP refrigerant are as follows.

(1) Halogenated hydrocarbon having carbon double bond in the composition: for example, HFO-1234yf ($CF_3CF=CH_2$). HFO stands for Hydro-Fluoro-Olefin, and an olefin is an unsaturated hydrocarbon having one double bond. The GWP of HFO-1234yf is four.

(2) Hydrocarbon having a carbon double bond in the composition: for example, R1270 (propylene). Note that, R1270 has the GWP of three which is smaller than the GWP of HFO-1234yf. However, R1270 has higher combustibility than HFO-1234yf.

(3) Mixture including at least one of halogenated hydrocarbon having a carbon double bond in the composition and hydrocarbon having a carbon double bond in the composition: for example, mixture of HFO-1234yf and R32. HFO-1234yf, which is a low-pressure refrigerant, has a large pressure loss, and therefore, a performance of the refrigeration cycle is easily deteriorated (especially in evaporator).

Therefore, the mixture of HFO-1234yf and R32 or R41, which is the refrigerant with higher pressure than HFO-1234yf, is usually used in practice.

The rotary compressor according to the second embodiment configured as described above have the similar advantages to those in the first embodiment, if the interior permanent magnet motor is used.

Furthermore, the present invention can be implemented as an air conditioner including the compressor according to the second embodiment as a component of a refrigeration circuit. The configuration of the components other than the compressor in the refrigeration circuit of the air conditioner is not particularly limited.

The structures illustrated in the above embodiments indicate exemplary contents of the present invention and can be combined with another known technique. Further, the structures illustrated in the embodiments can be partially omitted and changed without departing from the scope of the present invention.

The invention claimed is:

1. A rotor comprising:
a cylindrical rotor core having a plurality of magnet insertion holes extending along a central axis of the rotor core; and
permanent magnets, each inserted into a corresponding one of the magnet insertion holes, wherein
a slit extending along the central axis is provided between an outer circumferential surface of the rotor core and at least one of the magnet insertion holes,
each of the magnet insertion holes includes a hole inner line and a hole outer line, and the slit is closer to the hole outer line than to the hole inner line,
the slit has a triangular shape whose width decreases toward the magnet insertion holes in a plan view where the central axis is vertical,
the triangular shape of the slit comprises a pair of slit inner lines and a slit outer line in a plan view where the central axis is vertical, the slit inner lines extending toward the outer circumferential surface of the rotor core from an apex of the triangular shape, the apex being located on a side where the magnet insertion holes are located, the slit outer line connecting side ends of the slit inner lines, the side ends each being located on a side opposite to the apex,
each of the slit inner lines is located an interval away from the hole outer line of the magnet insertion hole in a direction along a magnetic pole center line,
the magnetic pole center line extends from the central axis of the rotor core through a center of the permanent magnet, and
the interval is minimum between the apex and the hole outer line of the magnet insertion hole and maximum between the side end of the slit inner line and the hole outer line of the magnet insertion hole.

2. A rotor comprising:
a cylindrical rotor core having a plurality of magnet insertion holes extending along a central axis of the rotor core; and
permanent magnets inserted into the magnet insertion holes, respectively, wherein
a slit extending along the central axis is provided between an outer circumferential surface of the rotor core and at least one of the magnet insertion holes,
the slit has a triangular shape whose width decreases toward the magnet insertion holes in a plan view where the central axis is vertical, and the triangular shape of the slit includes a pair of curved slit inner lines in a plan view where the central axis is vertical, the slit inner lines extending toward the outer circumferential surface of the rotor core from an apex of the triangular shape, the apex being located on a side where the magnet insertion holes are located.

3. The rotor according to claim 1, wherein
the rotor core is configured by stacking a plurality of steel sheets, and
an interval between the apex and each of the magnet insertion holes is larger than the thickness of the steel sheet.

4. A rotor comprising:
a cylindrical rotor core having a plurality of magnet insertion holes extending along a central axis of the rotor core; and
permanent magnets inserted into the magnet insertion holes, respectively, wherein
a slit extending along the central axis is provided between an outer circumferential surface of the rotor core and at least one of the magnet insertion holes, and
the slit includes a trapezoidal portion whose width decreases toward the magnet insertion holes in a plan view where the central axis is vertical.

5. The rotor according to claim 4, wherein
the rotor core is configured by stacking a plurality of steel sheets, and
an interval between the trapezoidal portion and each of the magnet insertion holes is larger than the thickness of the steel sheet.

6. An interior permanent magnet motor comprising:
a stator; and
a rotor according to claim 1 rotatably provided facing the stator.

7. A compressor comprising:
an interior permanent magnet motor according to claim 6; and
a compression element, the interior permanent magnet motor and the compression element being disposed in a sealed container.

8. The rotor according to claim 2, wherein
the rotor core is configured by stacking a plurality of steel sheets, and
an interval between the apex and each of the magnet insertion holes is larger than the thickness of the steel sheet.

9. An interior permanent magnet motor comprising:
a stator; and
a rotor according to claim 2 rotatably provided facing the stator.

10. An interior permanent magnet motor comprising:
a stator; and
a rotor according to claim 3 rotatably provided facing the stator.

11. An interior permanent magnet motor comprising:
a stator; and
a rotor according to claim 8 rotatably provided facing the stator.

12. An interior permanent magnet motor comprising:
a stator; and
a rotor according to claim 4 rotatably provided facing the stator.

13. An interior permanent magnet motor comprising:
a stator; and
a rotor according to claim 5 rotatably provided facing the stator.

14. A compressor comprising:
an interior permanent magnet motor according to claim 9; and
a compression element, the interior permanent magnet motor and the compression element being disposed in a sealed container.

15. A compressor comprising:
an interior permanent magnet motor according to claim 10; and
a compression element, the interior permanent magnet motor and the compression element being disposed in a sealed container.

16. A compressor comprising:
an interior permanent magnet motor according to claim 11; and
a compression element, the interior permanent magnet motor and the compression element being disposed in a sealed container.

17. A compressor comprising:
an interior permanent magnet motor according to claim 12; and
a compression element, the interior permanent magnet motor and the compression element being disposed in a sealed container.

18. A compressor comprising:
an interior permanent magnet motor according to claim 13; and
a compression element, the interior permanent magnet motor and the compression element being disposed in a sealed container.

19. The rotor according to claim 2, wherein each of the curved slit inner lines is convex outwardly of the slit.

20. The rotor according to claim 2, wherein each of the curved slit inner lines is convex inwardly of the slit.

* * * * *